(12) United States Patent
Redlingshöfer et al.

(10) Patent No.: US 11,508,504 B2
(45) Date of Patent: Nov. 22, 2022

(54) ELECTRIC WINDING BODY WITH OPTIMISED PERFORMANCE CHARACTERISTICS AND IMPROVED PROTECTION AGAINST OVERHEATING

(71) Applicant: smartpolymer GmbH, Rudolstadt (DE)

(72) Inventors: Benjamin Redlingshöfer, Ranis (DE); Martin Geissenhöner, Rudolstadt (DE); Hannes Schache, Rudolstadt (DE); Sabine Riede, Uhlstädt-Kirchhasel (DE)

(73) Assignee: smartpolymer GmbH, Rudolstadt (DE)

( * ) Notice: Subject to any disclaimer, the term of this patent is extended or adjusted under 35 U.S.C. 154(b) by 456 days.

(21) Appl. No.: 16/485,745

(22) PCT Filed: Feb. 16, 2018

(86) PCT No.: PCT/EP2018/053945
§ 371 (c)(1),
(2) Date: Aug. 13, 2019

(87) PCT Pub. No.: WO2018/150000
PCT Pub. Date: Aug. 23, 2018

(65) Prior Publication Data
US 2020/0005976 A1    Jan. 2, 2020

(30) Foreign Application Priority Data
Feb. 17, 2017 (DE) .................. 10 2017 001 547.3

(51) Int. Cl.
*H01F 5/06* (2006.01)
*C08L 25/06* (2006.01)
(Continued)

(52) U.S. Cl.
CPC .............. *H01F 5/06* (2013.01); *C08L 25/06* (2013.01); *C09K 5/063* (2013.01); *H01B 3/28* (2013.01);
(Continued)

(58) Field of Classification Search
CPC ........... H02K 3/30; H02K 3/32; H02K 3/325; H02K 3/34; H02K 3/345; H02K 3/38;
(Continued)

(56) References Cited

U.S. PATENT DOCUMENTS

| 4,199,743 A | 4/1980 | Martincic |
| 5,589,808 A | 12/1996 | Clark et al. |

(Continued)

FOREIGN PATENT DOCUMENTS

| DE | 19928323 A1 | 12/2000 |
| DE | 10329583 A1 | 2/2005 |

(Continued)

OTHER PUBLICATIONS

International Preliminary Report on Patentability of PCT/EP 2018/053945.
German Search Report for 10 2017 001 547.3, filed Feb. 17, 2017.

*Primary Examiner* — Eric Johnson
(74) *Attorney, Agent, or Firm* — ProPat, L.L.C.; Cathy Moore

(57) ABSTRACT

The invention relates to an electric winding body which has improved performance characteristics as a result of being impregnated with a thermoplastic material filled with phase change material. These performance characteristics relate to improved heat dissipation, vibration damping, fixing of the coils, and improved protection against overheating by utilizing the sensitive and latent heat storage properties when the polymer units transition from the semi-crystalline state into the amorphous state.

16 Claims, 1 Drawing Sheet

(51) Int. Cl.

| | |
|---|---|
| *C09K 5/06* | (2006.01) |
| *H01B 3/28* | (2006.01) |
| *H01B 3/44* | (2006.01) |
| *H01F 27/32* | (2006.01) |
| *H02K 3/30* | (2006.01) |
| *H02K 5/24* | (2006.01) |
| *H02K 15/12* | (2006.01) |

(52) U.S. Cl.
CPC ............ *H01B 3/441* (2013.01); *H01B 3/442* (2013.01); *H01F 27/327* (2013.01); *H02K 3/30* (2013.01); *H02K 5/24* (2013.01); *H02K 15/12* (2013.01)

(58) Field of Classification Search
CPC ........ H02K 5/24; H02K 15/12; H02K 15/125; H01F 5/06; H01F 27/327; C09K 5/063; C08L 25/04; C08L 25/06; H01B 3/28; H01B 3/441; H01B 3/442
See application file for complete search history.

(56) References Cited

U.S. PATENT DOCUMENTS

| | | | |
|---|---|---|---|
| 6,335,581 B1 * | 1/2002 | Warnke | ............... F02M 37/10 310/85 |
| 2004/0056537 A1 | 3/2004 | Du et al. | |
| 2006/0124892 A1 | 6/2006 | Rolland et al. | |
| 2013/0264896 A1 | 10/2013 | Morita et al. | |
| 2015/0235736 A1 | 8/2015 | Ikeda et al. | |

FOREIGN PATENT DOCUMENTS

| | | |
|---|---|---|
| DE | 102013215255 A1 | 2/2015 |
| EP | 2637176 A1 | 9/2013 |

* cited by examiner

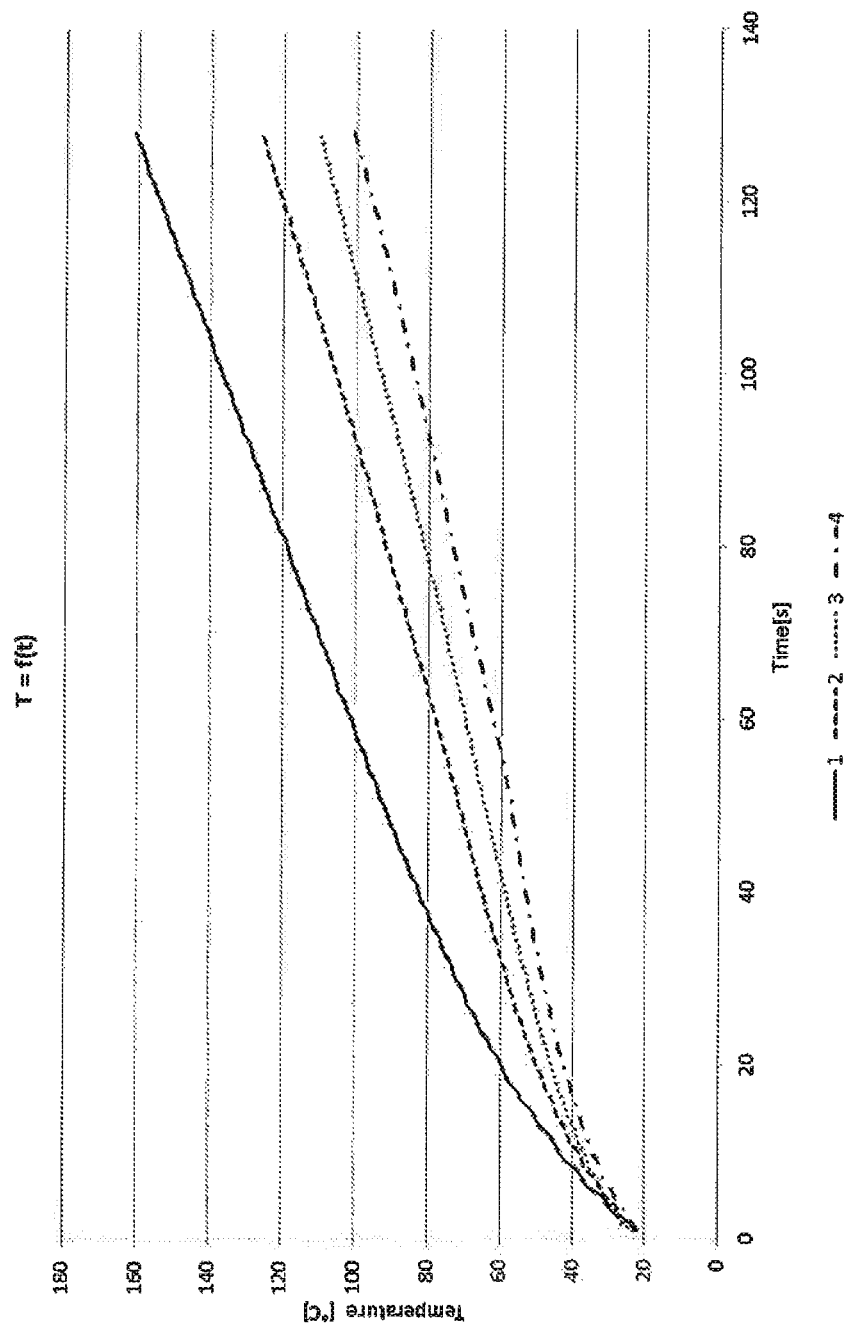

ELECTRIC WINDING BODY WITH OPTIMISED PERFORMANCE CHARACTERISTICS AND IMPROVED PROTECTION AGAINST OVERHEATING

CROSS-REFERENCE TO RELATED APPLICATIONS

This application is being filed under 35 U.S.C. § 371 as a National Stage Application of pending International Application No. PCT/EP2018/053945 filed Feb. 16, 2018, which claims priority to the following parent application: German Patent Application No. 10 2017 001 547.3, filed Feb. 17, 2017. Both International Application No. PCT/EP2018/053945 and German Patent Application No. 10 2017 001 547.3 are hereby incorporated by reference herein in their entirety.

FIELD OF THE INVENTION

The invention relates to an electrical winding form which has improved use properties through impregnation with a thermoplastic material filled with phase change material. These use properties relate to improved dissipation of heat, vibration damping, fixing of the windings, and improved protection from overheating by exploitation of the sensible and latent heat storage properties at the transition from the semicrystalline state of the polymer units to the amorphous state.

BACKGROUND OF THE INVENTION

Electrical winding forms comprise windings, usually insulated copper wires, wound around a core. The electrical winding form includes any kind of coils in the form of windings and wound goods that are suitable for production or detection of a magnetic field. These winding forms are used in electrical equipment such as transformers, transducers, rotors and stators of electrical machines. It is known (DE19928323) that relatively highly stressed coils that are processed in winding forms can be impregnated with synthetic resins in order to improve efficiency by minimizing power loss. The idea behind that is to replace the air-filled cavities between the windings with a synthetic resin. The synthetic resin has higher heat conductivity than air, meaning that it can better dissipate heat that arises in use. Moreover, the synthetic resin also has a higher density than air and can thus better compensate for imbalances and reduce vibrations. The impregnating serves to increase insulation resistance and additionally also to fix the windings and to improve the removal of heat from the winding form, and for corrosion protection. Thermosets are used in order to fill the cavities between the windings since these have very good flowability in the liquid state and hence can penetrate more easily into the cavities and are more thermally stable. A disadvantage of the thermosets is that these have to be cured in an additional operation and the phase transition to the solid phase is irreversible and the materials are very brittle after curing. If there is excessive thermal stress, these materials cannot compensate for or absorb this overload and are destroyed. Such a thermal overload can frequently occur in the case of electrical winding forms that are only ever in operation briefly, i.e. in the range from seconds up to a few minutes (<10 min), but repeatedly at greater or lesser intervals. For such winding forms, closed-loop temperature control by adjustment of the current is often not envisaged or not viable.

US20130264896 describes a cast body composed of a stator consisting of a magnetic coil on an iron core, encapsulated with an injection resin comprising a thermoset resin and a thermoplastic resin incompatible therewith, and containing inorganic additives (metal hydrates) and satisfying a thermal conductivity of ≥1.5 W/m·K and a flame retardancy to UL94 V-0. The amount of metal hydrate is ≥2 parts of casting resin. A cast motor comprises this cast body. The problem addressed was that of finding a plastic as insulator that simultaneously offers low shrinkage, high thermal conductivity and flame retardancy. The injection resin forms a kind of housing for the stator; the manner of manufacture and the composition do not permit displacement of all the air between the windings by the injection resin; improved heat management and vibrational stability are achieved, but large amounts of injection resin are required and this manner of encapsulating the winding is suitable only for stators. Moreover, the solution in this patent is designed for sustained stress on the coil, for continuous removal of the heat by means of a plastics housing of high thermal conductivity that releases the heat to the surface.

SUMMARY OF ADVANTAGEOUS EMBODIMENTS OF THE INVENTION

It is an object of the invention to provide a winding form which is used in transformers, transducers, rotors and stators of electrical machines, which has an improved total thermal capacity, reduces the occurrence of hotspots and can have a balancing effect in the event of thermal overload. The invention is to be effective in the event of short-term stresses (short-term operation); it is to absorb heat peaks with a very small use of material. Moreover, the invention is to be used in the case of windings both for stators and for rotors.

BRIEF DESCRIPTION OF THE FIGURE

FIG. 1 is a graphical illustration of the temperature of various winding forms over time.

DETAILED DESCRIPTION OF ADVANTAGEOUS EMBODIMENTS OF THE INVENTION

This object is achieved in accordance with the invention in that all cavities between the windings are filled with small amounts of a thermoplastic material (also referred to as composite material or compound) comprising a network of a thermoplastic elastomer (TPE) with a phase change material (PCM) distributed therein. The thermoplastic elastomers are to have a low softening point; the breakdown point of the melt should be at a temperature above the critical use temperature of the winding forms of 180° C. The thermoplastic elastomers generally have a glass transition temperature $T_g$ of less than 0° C., but no fixed melting point. The TPE preferably consists of a styrene block copolymer (TPE-S) characterized by its polymeric network structure in which the PCM is physically bound. The TPE-S is selected from the group of styrene block copolymers such as styrene-butadiene-styrene (SBS), styrene-ethylene-butylene-styrene (SEBS), styrene-ethylene-propylene-styrene block copolymer (SEPS), styrene-ethylene-ethylene-propylene-styrene block copolymer (SEEPS) and methylbutadiene-styrene (MBS), commercially available, for example, under the KRATON® (Kraton Polymers), SEPTON® (Kuraray), STYROFLEX® (BASF), THERMOLAST® (Kraiburg TPE) or SAXOMER® (PCW) names. Particularly suitable TPE-S are those that have a low glass transition temperature and very good flowability (low viscosity) at temperatures above 100° C. It is advantageous when the TPE-PCM compound has very good flowability, preferably a melt flow index of at least 15 g/10 min (190° C./2.16 kg, measured to ISO 1133-1), more preferably at least 20 g/10 min (190° C./2.16 kg, measured to ISO 1133-1). The mass of TPE-S in the later compound should not go below 10% by weight and is preferably between 15% and 25% by weight.

The displacement of the air from the cavities between the windings is effected mainly through the action of capillary forces that "suck" the thermoplastic material into these cavities. In order that the thermoplastic material can penetrate right into the winding and does not leave any cavities in which partial discharges could occur later, not only is the thermoplastic material heated but the winding material is also preheated to a temperature well above the heat distortion resistance temperature of the TPE-PCM compound to DIN EN ISO 75-1,-2,-3, usually to temperatures between 100 and 150° C. Without such preheating, there would be early occurrence of solidification processes in the winding material, and the already solidified PCM compound would prevent the penetration of further PCM compound. This heating can be effected in that the winding material is placed in an oven or electrical current is applied. The latter method has the advantage that the supply of energy can also be maintained during the impregnation. The capillary forces together with adhesion forces simultaneously also have the effect that the material does not escape again and "bleed out" immediately on softening, since the TPE-PCM compound is always in free-flowing form at the working temperatures of the winding form above 100° C.

The use of compounds filled with phase change materials as filler material additionally has the advantage that, in use, after the application of current, the phase change material is converted from the solid to the liquid phase and there is simultaneously an expansion in volume. This explains the observation that the thermal regulation effect is subject to further improvement after the first use since the increase in volume displaces further air from the cavities between the windings.

A method of filling the cavities between the windings of the electrical winding form may involve heating the thermoplastic material in a dipping apparatus by means of a hotplate, for example to a processing temperature of 170° C. To achieve a homogeneous mass, the thermoplastic material is stirred. The winding form is preheated in an oven to 120° C., for example, for 30 min. After the temperature of the melt of the thermoplastic material has matched the temperature of the dipping tool, the preheated winding form is pushed vertically into the dipping apparatus and, with minimum expenditure of force, the void volume of the winding form is filled completely. Thereafter, the winding form is pulled out of the dipping apparatus and cooled down to room temperature. On withdrawal from the dipping bath, TPE-PCM compound mass that has not penetrated into the windings drips off. If required, depending on the winding form, excess thermoplastic material outside the windings is removed. This is followed by heat treatment of the dipped winding form in an oven, for example in a preheated oven at 120° C. for 2 h. In this step too, excess TPE-PCM compound material can still drip off. The heat treatments result in form-fitting coverage of the copper windings with the polymeric filler material. Thereafter, the winding form is cooled back down to room temperature.

The TPE-PCM compound can also be applied by spraying or painting the preheated winding form with the heated TPE-PCM compound. It was observed here that, for example, after the painting and subsequent heat treatment, no TPE-PCM compound is present any longer on the surface of the windings, meaning that the material has been sucked in by the capillary forces at these points. Only in further cavities or grooves at the surface where the capillary forces are not active are there still small amounts of TPE-PCM compound. In this way, only very small amounts of filler material are required to avoid heat peaks in the event of short-term stress.

In this way, this type of thermal regulation of the winding material can also be employed for rotor windings, but in these cases a thin additional outer protective layer (seal) that keeps the thermoplastic filler material within the rotor in use is necessary. This may be a protective layer consisting of PE, PP, PA, PMMA, PS, PVC with a thickness of 100 to 500 μm, applied by means of casting, dipping, spraying or injection molding.

Another embodiment is the use of a spraying or conveying apparatus, for example a hot glue gun, for filling of the void volume. By means of mechanical/hydraulic/pneumatic pressure, the molten TPE-PCM compound is squirted into or entirely encapsulates the void volume of the winding form. This is followed by heat treatment of the immersed winding form in an oven, for example in a preheated oven at 120° C. for 2 h. This additionally assists penetration of the PCM compound into the winding capillary. Useful thermoplastic material includes all thermoplastics that fulfill the above-mentioned conditions with regard to melting point and flow ability and can simultaneously form a network for binding of phase change materials. These are preferably thermoplastic elastomers, especially styrene block copolymers (TPE-S). As well as the phase change materials, further additives may be added to the thermoplastic materials at up to 20% by weight, such as electrically nonconductive materials or else conductive materials in proportions below the percolation threshold, additives that increase thermal conductivity, non-magnetic materials that increase density, flame retardants that have a positive effect on fire characteristics in the event of overload, especially of the lacquered copper wire, agents that affect flow characteristics.

The proportion of these additives in the thermoplastic compound may be between 0% and 20% by weight.

Preferably between 75% and 85% by weight of phase change materials are added to the thermoplastic elastomers that form a polymeric network for phase change materials, in order to achieve an optimal effect. The phase transition (melting) temperature of the phase change materials is matched to the use temperature of the winding forms. It must not be chosen at too low a level; in that case, the effect of heat storage during melting cannot be exploited and the temperature of the filled winding forms evolves similarly to the temperature curve of a winding filling with unfilled plastics compounds.

Too low a melting point (<60° C.) with respect to the working temperature has the effect that, given normal stress on the coil, even ground temperatures greater than the melting temperature of the PCM are present (for example in the case of a PCM filling having a melting temperature of 42° C.). Thus, the latent storage of heat no longer has any effect and only the sensible component is available for absorption of the waste heat. The maximum working temperature determines the selection of the PCM melting point. In the case of a working temperature not greater than 80° C., for example, a PCM having a melting point of 62° C. is selected.

Suitable phase change materials are dialkyl ethers having long-chain alkyl radicals, n-alkanes, mono- or polyhydric alcohols (e.g. polyethylene glycol), PE wax, in each case with melting temperatures in the range from 40 to 140° C. and preferably between 80 and 130° C. "Dialkyl ethers having long-chain alkyl radicals" are understood here to mean those that have at least 28 carbon atoms in the two alkyl radicals together. These are, for example: di-n-myristyl ether (melting point 44° C.), di-n-cetyl ethers (melting point 54° C.) or di-n-stearyl ether (melting point 62° C.), respectively available under the NACOL® ether 14, NACOL® ether 16 and NACOL® ether 18 name from Sasol. In the case of polymeric phase change materials, the molecular weight is generally 100000 g/mol or less, preferably 30000 g/mol or less. The heat regulation effect depends firstly on the proportion of PCM in the filler material and on the amount of polymeric filler material between the windings.

If overheating occurs during the operation of the winding forms, the thermoplastic material absorbs excess heat, both sensible heat and latent heat at the transition from a semicrystalline state to an amorphous state, and conducts it onward to cooling units owing to the good thermal conductivity of more than 0.2 W/mK. The latent storage of heat can avoid damage through overheating or delay the onset thereof.

Advantageously, the winding forms of the invention are used in applications where these winding forms are only ever briefly in operation, i.e. in the range from seconds to a few minutes (<10 min), but repeatedly at greater or lesser intervals. Examples of these are window lifts, electrical door openers, shutter operators and the like.

EXAMPLES

Test method

The temperature of a winding form (3) is determined via the measurement of the resistance-dependent voltage drop, which is logged directly in the commutator over a period of 2 min at a time interval of 1 s. The Manson HCS-3202 (1) laboratory power supply feeds an electrical current of 8 A into the winding. The C-122 (2) data logger measures the temperature-dependent drop in voltage every second. Power supply (1), data logger (2) and winding form (3) are connected in parallel in a circuit. The calculation of temperature was conducted by the following equation:

$$\rho(T)=\rho(T_0)*(1+\alpha*(T-T_0))$$

where $\alpha$ is the temperature coefficient ($\alpha_{copper}$=0.00393 1/K), T is the temperature and $T_0$ is any temperature at which the specific electrical resistivity $\rho(T_0)$ is known. Since the evolution of heat in the anchor coil is subjected to local variations, an average temperature value is accordingly determined on the filled coils.

Example 1 without Filling

Using a commercial winding form with copper windings, diameter of copper wire 0.5 mm, length 15 m, without integrated filling, by the test method specified above, the temperature-dependent change in resistance is measured and the temperature is calculated. The result of the measurement is shown in FIGURE 1, curve 1 (no filling). This curve serves for comparative purposes.

Example 2 with PE

A free-flowing PE from LyondellBasell (LUPOLEN® 1800S) is integrated into the coil according to example 1, the weight of which has been determined beforehand, by the method of dipping or spraying. For this purpose, the coil, prior to the filling, is heated to a temperature of 120° C. and, after the filling, kept in a heated chamber at 140° C. for 30 min, and then cooled down to room temperature. As a result, the copper windings and all cavities in the windings are covered with the PE in a form-fitting manner. By measuring the weight of the coil after the dipping or spraying, the amount of PE that has penetrated into the windings of the coil is determined. The mass is 4 g. Then the change in temperature is determined by the method described above. The result of the measurement is shown in FIGURE 1, curve 2 (with PE).

Example 3 with PE and Graphite

A PE from LyondellBasell (LUPOLEN® 1800S) is filled with 20% graphite (SC20O, from Kropfmühl). The free-flowing PE is integrated into the coil according to example 1, the weight of which has been determined beforehand, by the method of dipping or spraying and heat treatment according to example 2. By measuring the weight of the coil after the dipping or spraying, the amount of PE that has penetrated into the windings of the coil is determined. The mass is 4 g. Then the change in temperature is measured by the method described above. The result of the measurement is shown in FIGURE 1, curve 3 (PE+graphite).

Example 4 with PCM 82° C.

A PCM compound (OC.82, from Smartpolymer, melting point 82° C., 80% by mass of PCM in a TPE-S (Kuraray, SEPTON® 4055) network is integrated into the coil according to example 1, the weight of which has been determined beforehand, by the method of dipping or spraying and heat treatment according to example 2. By measuring the weight of the coil after this operation, the amount of PCM compound that has penetrated into the windings of the coil is measured. The mass is 4 g. Then the change in temperature is measured by the method described above. The result of the measurement is shown in FIGURE 1, curve 4 (with PCM 82° C.).

Evaluation of the experimental results, shown in FIGURE 1:

Evaluation of Curve 1 without Filling

After an operating time of 120 s, the temperature at the unfilled coil reaches a maximum temperature of 160° C. In the case of even higher temperatures, there is thermal damage to the copper coil.

Evaluation of Curve 2 PE

The displacement of the air from the void volume of the coil by the PE increases the thermal conductivity and the thermal mass. The PE serves to store sensible heat and stores the waste heat that arises; an attenuated rise in temperature takes place. Compared to unfilled windings, a longer operating time of about 30% can be enabled before the maximum temperature is attained. With the same operating time, the maximum temperature can be lowered by about 18% ("with PE" curve).

Evaluation of Curve 3 PE+Graphite

The displacement of the air from the void volume of the coil by PE with graphite increases the thermal mass and thermal conductivity by comparison with air and PE without graphite from 0.3 to 0.9 W/m*K. The PE with graphite serves to store sensible heat with elevated thermal conductivity, as a result of which the waste heat is removed and stored more quickly; an attenuated rise in temperature takes place. Compared to unfilled windings, a longer operating time of about 55% can be enabled before the maximum temperature is attained. With the same operating time, the maximum temperature can be lowered by about 22%.

Evaluation of Curve 4 with PCM 82° C.

The displacement of the air from the void volume of the coil by the TPE-S polymer mixture with PCM 82° C. (curve 4) increases the thermal conductivity and the thermal mass. By virtue of its very good flow characteristics, the TPE-PCM compound is penetrated optimally between the windings, which increases heat transfer. Almost simultaneously, the effect of latent heat storage also sets in; see, as a comparison, the curve profile without filling; the windings have already reached 80° C. after 40 sec, whereas, in the case of filling with the TPE_PCM compound, 80° C. is not reached until after about 95 s. Therefore, the rise in this curve is lower at a very early stage than in the other curves. The PCM 82° C. serves to store latent heat with storage capacity up to 2-4 times higher compared to PE and stores the waste heat that arises; an attenuated rise in temperature takes place. Owing to the change in phase at 82° C., the waste heat that arises is utilized for the solid-liquid phase transition, where several times the amount of energy can be stored within a small temperature range. Undergoing the change in phase results in an expansion in volume. This promotes fitting of the PCM to the surface of the winding form, which additionally minimizes transfer resistances and increases heat transfer. Compared to unfilled windings (curve 1), a longer operating time of about 75% can be enabled before the maximum temperature is attained. With the same operating time, the maximum temperature can be lowered by about 30%. Compared to windings with PE filling (curve 2), it is possible to achieve a longer operating time of about 40% before the maximum temperature is attained. With the same operating time, the maximum temperature can be lowered by about 15%.

Compared to windings with PE and graphite filling (curve 3), it is possible to enable a longer operating time of about 20% before the maximum temperature is attained. With the same operating time, the maximum temperature can be lowered by 8%.

The invention claimed is:
1. An electrical winding form comprising electrically conductive windings around a core, wherein the windings have cavities between them that are filled in a form-fitting manner by a thermoplastic material, the thermoplastic material comprising a mixture of
   a) a network-forming thermoplastic elastomer which, in the range of 120-150 ° C., has flowability and a melt flow index of at least 15 g/10 min, at 190 ° C/2.16 kg measured per ISO 1133-1 and
   b) a phase change material having a phase change temperature between 40 ° C. and 140 ° C., where the phase change material is present in the thermoplastic material in a proportion of 50% to 85% by weight, wherein the network-forming thermoplastic elastomer is a styrene-containing block copolymer and is present in a proportion of at least 10% by weight, based on the weight of the thermoplastics material.

2. The winding form as claimed in claim 1, wherein the phase change material has a melting temperature between 40 ° C. and 140 ° C.

3. The electrical winding form as claimed in claim 1, wherein the thermoplastic material has a breakdown temperature that is above the electrical winding form critical use temperature.

4. The electrical winding form as claimed in claim 1, wherein the phase change material is present in the thermoplastic material in a proportion of 70% to 85% by weight.

5. The electrical winding form as claimed in claim 1, wherein the thermoplastic material contains functional additives that increase thermal conductivity, increase density, affect the flow characteristics of the melt and/or act as flame retardants.

6. The electrical winding form as claimed in claim 5, wherein the proportion of the functional additives is 0% to 20% by weight, based on the total weight of the thermoplastic material.

7. The electrical winding form as claimed in claim 1, wherein the winding form is surrounded by an outer protective layer that keeps the thermoplastic material within the winding form.

8. The electrical winding form as claimed in claim 1, wherein said winding form is part of a transformer, a transducer or a rotor or stator of an electrical machine, where these winding forms are only ever briefly in operation.

9. The electrical winding form as claimed in claim 1, wherein the network-forming thermoplastic elastomer has a melt flow index of at least 20 g/10 min, at 190 ° C/2.16 kg measured per ISO 1133-1.

10. The electrical winding form as claimed in claim 1, wherein the phase change temperature of the phase change material is between 80 and 130 ° C.

11. The winding form as claimed in claim 1, wherein the styrene-containing block copolymer is selected from styrene-butadiene-styrene, styrene-ethylene-butylene-styrene, styrene-ethylene-propylene-styrene, styrene-ethylene-ethylene-propylene-styrene, and methyl butadiene-styrene, and is present in a proportion of between 15% by weight and 25% by weight, based on the weight of the thermoplastics material.

12. The winding form as claimed in claim 2, wherein the phase change material consists of an alcohol ether, a dialkyl ether, a paraffin or a natural or synthetic wax.

13. The electrical winding form as claimed in claim 7, wherein the winding form is a rotor winding.

14. The electrical winding form as claimed in claim 7, wherein the protective layer consists of polyethylene, polypropylene, polyamide, polymethylmethacrylate, polystyrene or polyvinyl chloride and has a thickness of 100 to 500 µm.

15. The electrical winding form as claimed in claim 8, wherein the winding forms are in operation within a time ranging from seconds to less than 10 min.

16. The electrical winding form as claimed in claim 1, wherein the winding does not reach 80 ° C. until after 95 seconds for phase change material having a phase change temperature of 82 ° C.

* * * * *